(12) United States Patent
Chan (10) Patent No.: US 8,619,386 B2
(45) Date of Patent: Dec. 31, 2013

(54) MINIMIZING FLOW INDUCED VIBRATION IN A HARD DISK DRIVE WITH A HYBRID PLANAR PLATE HAVING A BYPASS CHANNEL

(75) Inventor: Andre S. Chan, Milpitas, CA (US)

(73) Assignee: HGST Netherlands B.V., Amsterdam (NL)

( * ) Notice: Subject to any disclaimer, the term of this patent is extended or adjusted under 35 U.S.C. 154(b) by 892 days.

(21) Appl. No.: 12/109,829

(22) Filed: Apr. 25, 2008

(65) Prior Publication Data
US 2009/0268341 A1 Oct. 29, 2009

(51) Int. Cl.
*G11B 33/14* (2006.01)
*G11B 25/04* (2006.01)

(52) U.S. Cl.
CPC .................................. *G11B 25/043* (2013.01)
USPC ....................................................... 360/97.13

(58) Field of Classification Search
None
See application file for complete search history.

(56) References Cited

U.S. PATENT DOCUMENTS

| | | | |
|---|---|---|---|
| 5,441,791 A | 8/1995 | Eden | |
| 6,097,568 A | 8/2000 | Ekhoff | |
| 6,542,328 B2 * | 4/2003 | Harrison et al. | 360/97.03 |
| 6,628,475 B2 | 9/2003 | Nakamoto et al. | |
| 6,747,849 B1 | 6/2004 | Le et al. | |
| 6,898,049 B2 | 5/2005 | Shimizu et al. | |
| 6,989,959 B2 | 1/2006 | Chang et al. | |
| 7,733,602 B2 * | 6/2010 | Gross et al. | 360/97.02 |
| 7,787,213 B1 * | 8/2010 | Michael et al. | 360/97.03 |
| 2005/0190488 A1 | 9/2005 | Chan et al. | |
| 2006/0002008 A1 * | 1/2006 | Lim | 360/97.02 |
| 2006/0066992 A1 | 3/2006 | Chan et al. | |
| 2006/0238915 A1 | 10/2006 | Hendriks | |
| 2008/0100957 A1 * | 5/2008 | Gross et al. | 360/97.02 |

FOREIGN PATENT DOCUMENTS

JP 2002109858 4/2002

OTHER PUBLICATIONS

Nakamura, S. et al., "Reducing Flow-Induced-Vibration of Head-Gimbal-Assemblies in Hard-Disk-Drives", *Asia-Pacific Magnetic Recording Conference*, 2006, Publication Date: Nov. 29, 2006-Dec. 1, 2006 http://www.ieexplore.ieee.org/search/srchabstract.jsp?arnumber=4215336&isnumber=4215263&punumber=4215262&k2dockey=4215336@ieeenfs&duery=%28%28reducind_+flo, (Nov. 29, 2006),2 pages.

Teerhuis, A. P., et al., "Reduction of Flow Induced Suspension Vibrations in a Hard Disk Drive by Dual-Stage Suspension Control", *Magnetic Conference*, 2003, Volume, Issue, Mar. 28-Apr. 3, 2003 http://www.ieeexplore.iee.org/search/srchabstract.jsp?arnumber=1230939&isnumber=27573&punumber=8707&k2dockey=1230939@ieeenfs&duery=%28%28_reduction+of+flow+induced+suspension+vibrations+, (Mar. 28, 2003),HE-08.

(Continued)

*Primary Examiner* — David D Davis (57) ABSTRACT

An airflow control device for a hard disk drive comprises an outer perimeter having a radius equal to or greater than an outer radius of a disk in the hard disk drive. The airflow control device has a thickness less than the spacing between adjacent disks in the hard disk drive. The airflow control device has a central opening with an inner perimeter greater than the outer circumference of a spacer ring of the hard disk drive. A notch in the outer perimeter is configured to accommodate the actuator assembly of the hard disk drive. A bypass slot transecting the perimeter has a bend with a radius nearly centered to the central opening.

22 Claims, 6 Drawing Sheets

(56) References Cited

OTHER PUBLICATIONS

Ono, Kyosuke "Study of Nanodynamics in Hard Disk Drive Technology", *Micro-Nanemechatronics and Human Science, 2004. Proceedings of the 2004 International Symposium on,.*, (Oct. 31, 2004),47-55.

Shigenori, Takada et al., "Study of Flow-Induced Vibration of Head-Disk Assembly Mechanisms in Actaul Hard Drive", *Microsystem Technologies archive*, vol. 13, Issue 8-10 http://portal.acm.org/citation.cfm?id+1284748, (Apr. 2007),2 pages.

\* cited by examiner

MINIMIZING FLOW INDUCED VIBRATION IN A HARD DISK DRIVE WITH A HYBRID PLANAR PLATE HAVING A BYPASS CHANNEL

TECHNICAL FIELD

Embodiments of the present invention relate generally to the field of direct access storage devices and in particular to the mitigation of flow induced vibration.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Assembly (HDA) has undergone many changes.

Vibration can limit the performance of an HDD. Vibrations that enter the HDD from external sources are controllable by various methods and systems well known in the art. These methods can range from vibration absorbent materials to extraneous systems such as shock absorbers and active vibration control systems with feedback loops.

Internal vibrations that are generated by components within the HDD can present challenges to HDD designers. Sources of internal vibrations are typically those components that need to move to perform their desired function, such as the actuator assembly and motor-hub assembly. The performance requirements of the HDD to access and store data determine the speed and cyclic frequency at which the actuator assembly moves and the speed at which the motor-hub assembly rotates. When unwanted vibrations occur due to the speed of the actuator assembly and motor-hub assembly, their mitigation can be very challenging.

SUMMARY OF THE INVENTION

Various embodiments of the present invention, minimizing flow induced vibration in a hard disk drive with a hybrid planar plate having a bypass channel, are described herein. In one embodiment, an airflow control device is described for a hard disk drive comprising an outer perimeter having a radius equal to or greater than an outer radius of a disk in the hard disk drive. The airflow control device has a thickness less than the spacing between adjacent disks in the hard disk drive. The airflow control device has a central opening with an inner perimeter greater than the outer circumference of a spacer ring of the hard disk drive. A notch in the outer perimeter is configured to accommodate the actuator assembly of the hard disk drive. A bypass slot transecting the perimeter has a bend with a radius nearly centered to the central opening.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with an overview of the effects vibration can have on an HDD, in particular airflow induced vibration and the effects on a disk and an actuator. The discussion will then focus on embodiments of the present invention that mitigate airflow induced vibration. The implementation of embodiments of the present invention will then be discussed.

Overview

Figure 1:
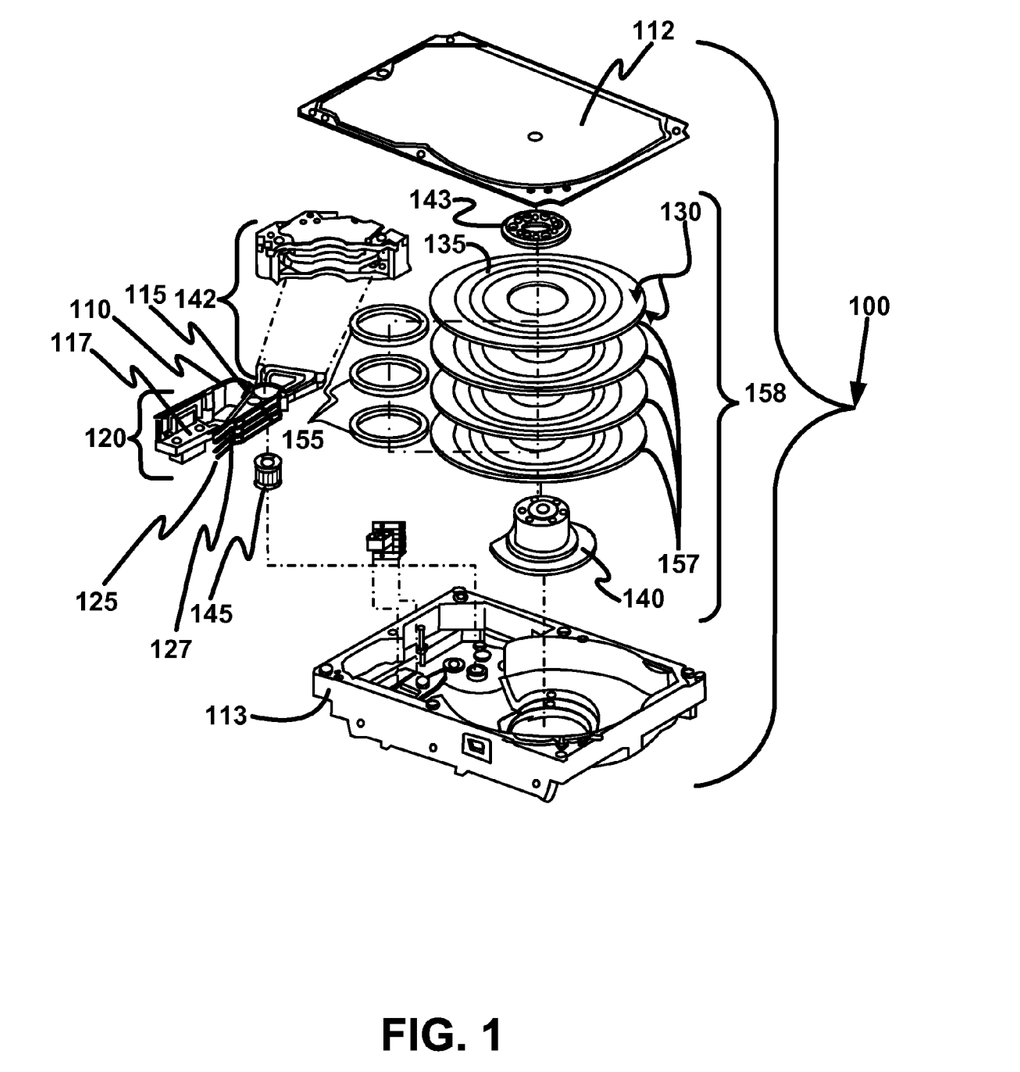
FIG. 1 is an isometric blow-apart of an HDD operable to embodiment of the present invention.

With reference to FIG. 1, an isometric blow-apart of HDD 100 is shown in accordance with an embodiment of this invention. Base casting 113 provides coupling points for components and sub-assemblies such as disk stack 158, voice coil motor (VCM) 142, and actuator assembly 120. Disk stack 158 is coupled to base casting 113 by means of motor-hub assembly 140. Disk stack 158 comprises: motor-hub assembly 140, which has at least one disk 157 coupled to it; at least one spacer ring 155 for separating adjacent disks 157; and disk clamp 143 for securing disks 157 and spacer ring 155 to motor-hub assembly 140. Disk 157 has at least one surface 130 upon which reside data tracks 135. Disk 157 is coupled to motor-hub assembly 140 whereby disk 157 can rotate about an axis common to motor-hub assembly 140 and the center of disk 157.

Actuator assembly 120 comprises suspension 127, which suspends hard disk drive slider 125 next to disk surface 130, and connector 117, which conveys data between arm electronics (A/E) 115 and a host system wherein HDD 100 resides. Flex-cable 110, which is part of actuator assembly 120, conveys data between connector 117 and A/E 115. Actuator assembly 120 is coupled pivotally to base casting 113 by means of pivot bearing 145, whereby VCM 142 can move HDD slider 125 arcuately across data tracks 135. Upon coupling of actuator assembly 120, disk stack 158, VCM 142, and other components with base casting 113, cover 112 is coupled to base casting 113 to enclose these components and sub-assemblies into HDD 100.

It is well understood by one of ordinary skill in the art that the arcuate positioning of HDD slider 125 to data tracks 135 is controlled by a position control system that comprises a servo system with a servo loop. As known by one of ordinary skill in the art, the servo loop of the servo system of an HDD feeds back positional information of slider 125 to a position controller, whereby adjustments can be made to the actual position of slider 125 to meet more closely the requested position of slider 125. The actual position of slider 125 can be different from the requested position of slider 125 due to several disturbances to the servo system. In general, there are two classifications of disturbances which can effect the position of slider 125. These are repeatable run-out (RRO) and non-repeatable run-out (NRRO).

RRO can be characterized by a vibration frequency that changes the position of HDD slider 125 with respect to data tracks 135 in a predictable manner. Examples of causes of RRO which are well known to one of ordinary skill in the art are vibration resulting from tolerances in motor-hub assembly 140, and resonant frequencies in actuator assembly 120. These examples of RRO are not intended to be an extensive or exhaustive list of causes of RRO. For the sake of brevity and clarity these examples are broad and general. It is appreciated that motor-hub assembly 140 and actuator assembly 120 have many conditions within each assembly and within each component comprised within each assembly which can result in RRO.

Since RRO is predictable, it can be mitigated by techniques well known in the art, such as vibration damping, filtering the frequency of vibration from the servo system, and designing components to vibrate at frequencies that differ from those frequencies of the servo system.

NRRO can be characterized by its unpredictable nature. The vibration frequency at which NRRO occurs is typically random and is difficult and sometimes impossible to mitigate with servo system filters and/or damping. The most common cause of NRRO is airflow induced vibration. Airflow induced vibration is more commonly known as flow-induced vibration or FIV.

The primary source of FIV is the spinning of disk stack 158, which is required for the operation of HDD 100. As disk 157 spins, surface 130 entrains air into disk stack 158 and causes the air mass to move and circulate within the enclosure of HDD 100 defined by base casting 113 and cover 112. HDD 100 comprises several sub-assemblies and components such as actuator assembly 120, VCM 142, and flex-cable 110 which can be buffeted and reacted upon by the entrained moving air mass. Actuator assembly 120, VCM 142, and flex-cable 110 are dynamic sub-assembly and components, which under normal operation are changing their position within the airflow. Since their positions are changing, the effects that the airflow has on them are also changing and are unpredictable.

Adjacent disks 157 also are affected by the entrained air mass and can contribute to NRRO. Well known and understood by one of ordinary skill in the art, centrifugal force from the rotation of disk stack 158 forces air from adjacent disks 157 an out towards the outer circumference of disks 157. There is a complex interchange of airflow entering and exiting disk stack 158. The entering and exiting of air interacts with adjacent disks 157 by spilling over the outer circumference of disk 157 and entering the next adjacent space between disks 157. This interaction buffets disks 157 and hence moves data tracks 135 in an unpredictable manner with respect to HDD slider 125.

In a similar manner actuator assembly 120 is also buffeted by the interaction of air between disks 157. Under normal operating conditions of HDD 100, actuator assembly 120 penetrates disk stack 158 and traverses across the circumference of disk 157 and disk surface 130. Actuator assembly 120 can be buffeted by the interaction of airflow entering and exiting disk stack 158. The buffeting of actuator assembly 120 results in random vibration frequency of actuator assembly 120 and NRRO of HDD slider 125 with respect to data tracks 135.

It can be appreciated that controlling the buffeting and interaction of airflow with actuator assembly 120 and disk 157 is a desirable design goal for an HDD designer. Well understood and known by one of ordinary skill in the art is an apparatus for reducing the buffeting of the airflow. This device is a plate that is inserted between disks and changes the turbulent flow characteristic of the airflow entering and exiting disk stack 158 to laminar flow. This plate is known in the art as: anti-disk, damper plate, interleaved plate, and planar plate. Such a device will be referred to from hereon as a planar plate.

It is well understood and known by one of ordinary skill in the art that a planar plate suppresses the airflow from entering and exiting disk stack 158. It is also appreciated that the movement of the airflow within HDD 100 is also suppressed. In this manner, the momentum of the airflow mass is reduced and thus impinges upon actuator assembly 120 and flex-cable 110 with less force resulting in less NRRO. The laminar flow enabled by the planar disk reduces the turbulent flow between disks 157 and around actuator assembly 120, thereby also reducing NRRO.

There is a penalty to HDD 100 for reducing NRRO with a planar plate. The power consumption of motor-hub assembly 140 and heat generated within HDD 100 increase. The momentum of the airflow mass is absorbed by the planar plate and is dissipated as heat inside HDD 100. The absorption of the airflow mass momentum by the planar plate requires more power to be consumed by motor-hub assembly 140 to maintain the required rotational speed of disk stack 158.

An alternate technique for suppressing NRRO that is well understood and known by one of ordinary skill in the art is to direct the moving airflow mass that exits disk stack 158 away from actuator assembly 120. By directing the moving airflow mass to flow around the outer walls of base casting 113 and bypass actuator assembly 120, the momentum of the airflow is preserved and returned to disk stack 158, thereby avoiding the penalties of the planar plate, e.g. added power consumption of motor-hub assembly 140 and added heating of HDD 100. Bypassing the airflow around actuator assembly 120 greatly reduces FIV effects of airflow on actuator assembly 120.

The bypass technique described above helps reduce FIV due to the airflow buffeting of disk 157 to some extent. In practice, the bypass technique described above has regions in disk stack 158 wherein regions of turbulent airflow often remain. These regions of turbulent flow typically occur in a circumferential region 180° away from actuator assembly 120. There is a complex exchange of airflow across disk surface 130 over the perimeter of disk 157 in the axial direction of disk stack 158, which results in the buffeting of disk 157 and thus causes disk 157 to vibrate and move with respect to HDD slider 125. The bypass technique described above does little to reduce the turbulent flow between disks 157 and does not completely address the turbulent airflow effect on FIV and NRRO.

Embodiments of the present invention enable the benefits of both the planar plate technique and the bypass technique to be combined into one airflow control device and method for reducing FIV. Embodiments of the present invention present a hybrid planar plate having a bypass slot that when coupled with an HDD presents a bypass channel. Embodiments of the present invention mitigate NRRO while reducing and/or eliminating the power and thermal penalty which typically result from a planar plate device. Embodiments of the present invention enable a hybrid design of a planar plate and a bypass channel, which produces laminar flow within disk stack 158 while preserving the momentum of the moving airflow mass.

Physical Description

Figure 2A:
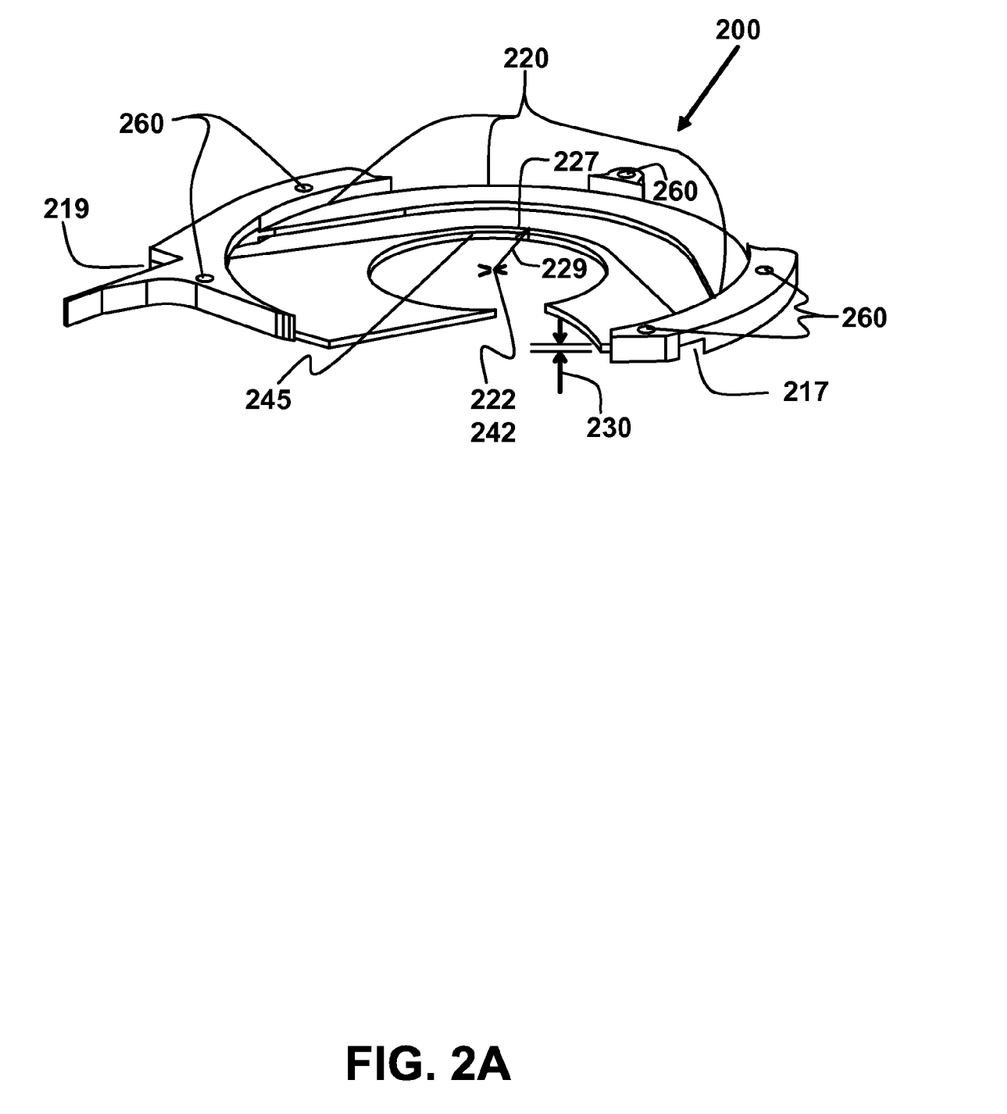
FIGS. 2A and 2B are top and bottom isometric views of a hybrid planar plate with a bypass slot in accordance with an embodiment of the present invention.
Figure 2B:
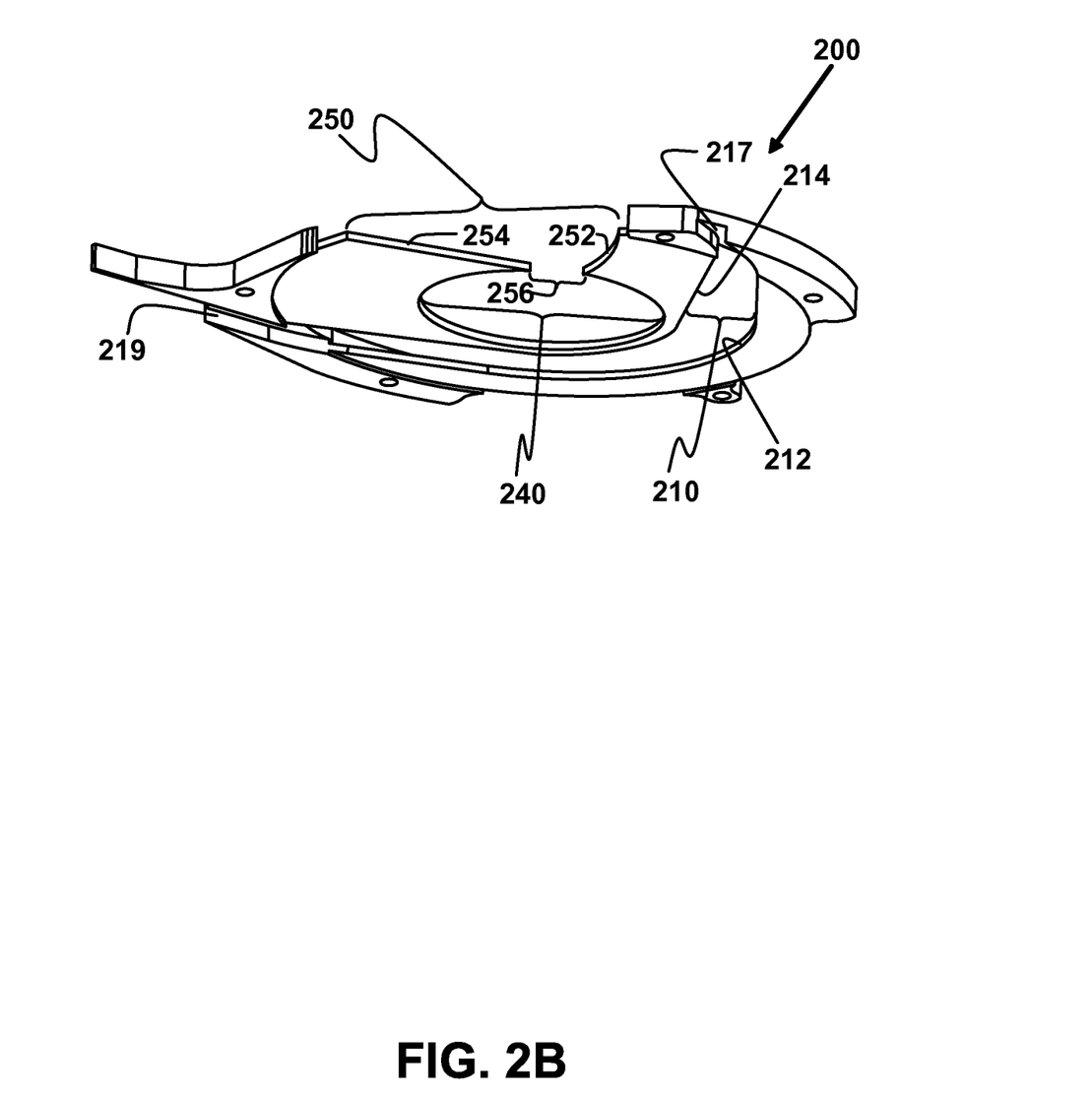

With reference to FIG. 2A and FIG. 2B, a top and bottom isometric view of hybrid planar plate 200 with bypass slot 210 is presented in accordance with an embodiment of the present invention. Hybrid planar plate 200 is an airflow control device configured to mitigate flow-induced vibration (FIV) within HDD 100.

In accordance with an embodiment of the present invention, an airflow control device such as hybrid planar plate 200 comprises outer perimeter 220 having a radius which is equal to or greater than the outer radius of disk 157 in HDD 100. Thickness 230 of hybrid planar plate 200 is less than the spacing between adjacent disks 157 in HDD 100. The spacing between adjacent disks 157 in HDD 100 is defined by the thickness of spacer ring 155. Hybrid planar plate 200 comprises central opening 240 which has an inner perimeter surface 245 having a radius 229 that is greater than the outer radius of spacer ring 155. Notch 250 in outer perimeter 220 of hybrid planar plate 200 accommodates actuator assembly 120 of HDD 100. Notch 250 provides access to disk 157 by actuator assembly 120 and HDD slider 125 for arcuate accessing of data tracks 135. Hybrid planar plate 200 comprises bypass slot 210.

In accordance with an embodiment of the present invention, hybrid planar plate 200 comprises bypass slot 210 which transects outer perimeter 220. Bypass slot 210 of hybrid planar plate 200 further comprises bend 227 with radius 229 whose center 222 is nearly coincident with center 242 of central opening 240. In general, bypass slot 210 comprises surfaces (212, 214). Surfaces (212, 214) are separate along their lengths by a distance that can vary along the lengths of surfaces (212, 214). In accordance with another embodiment of the present invention, bypass slot 210 of hybrid planar plate 200 is open and coupled to central opening 240, whereby the surface 214 of bypass slot 210 which has bend 227 is discontinuous. Bypass slot 210 comprises first distal opening 217 which is operable to receiving airflow that is entrained by rotating disk 157 and second distal opening 219 which is operable to emitting airflow that is entrained by rotating disk 157.

Notch 250 in outer perimeter 220 of hybrid planar plate 200 provides access for actuator assembly 120. In accordance with an embodiment of the present invention notch 250 comprises at least one curved surface 252, whereby the surface area of hybrid planar plate 200 is maximized while accommodating the arcuate motion of actuator assembly 120. In accordance with another embodiment of the present invention, notch 250 comprises at least one approximately flat surface 254, whereby clearance is provided to accommodate the accessing limit of actuator assembly 120. In accordance with another embodiment of the present invention, notch 250 is open and coupled to central opening 240 by gap 256 comprised within inner perimeter surface 245. In accordance with another embodiment of the present invention, gap 256 is configured to allow passage of spacer ring 155 to facilitate the assembly of HDD 100.

In accordance with an embodiment of the present invention, hybrid planar plate 200 has attachment feature 260 for mechanically coupling outer perimeter 220 to HDD 100. There exist many attachment techniques well known to one of ordinary skill in the art for coupling hybrid planar plate 200 to HDD 100. For example, hybrid planar plate 200 is coupled to HDD 100 by adhesive bonding; by welding; by riveting, by swaging; and by fastening with screws to base casting 113. Welding, riveting, and swaging hybrid planar plate 200 to base casting 113 is typically performed prior to assembly of fragile sub-assemblies such as actuator assembly 120 and disk stack 158. Coupling hybrid planar plate 200 to base casting with screws and adhesive can be performed prior to or after assembly of fragile sub-assemblies such as actuator assembly 120 and disk stack 158.

Figure 3:
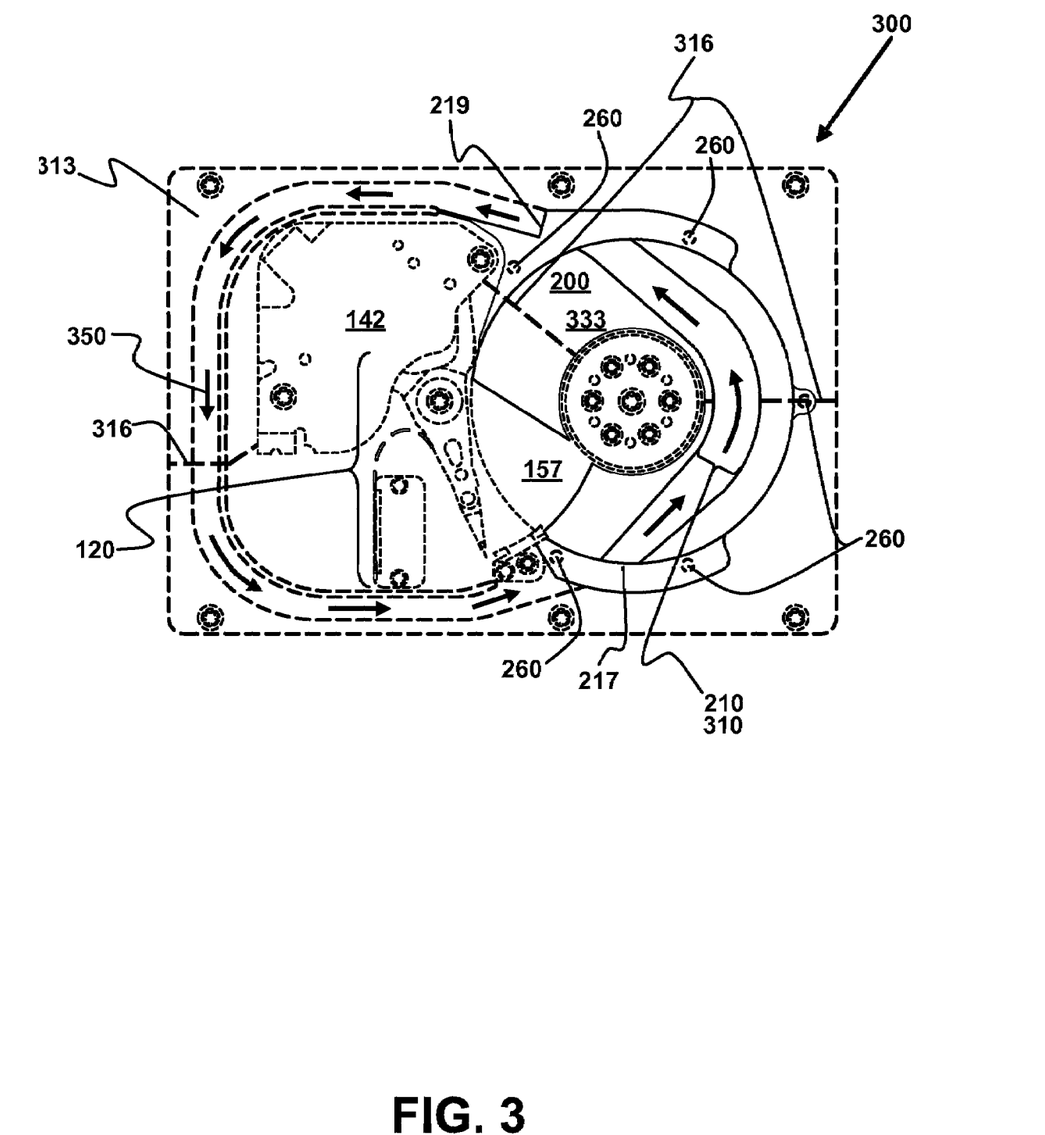
FIG. 3 is a plan view of a hard disk drive with cover removed in accordance with an embodiment of the present invention.

With reference to FIG. 3, a plan view of HDD 300 with cover 112 removed is presented in accordance with an embodiment of the present invention. Reference is made to FIG. 1 for components and sub-assemblies not visible in the plan view of HDD 300 in FIG. 3. As with HDD 100 presented in FIG. 1, HDD 300 comprises the following: Base casting 313 provides coupling points for components and sub-assemblies such as disk stack 158, voice coil motor (VCM) 142, and actuator assembly 120. Disk stack 158 is coupled to base casting 113 by means of motor-hub assembly 140. Disk stack 158 comprises: motor-hub assembly 140, which has at least one disk 157 coupled to it; at least one spacer ring 155 for separating adjacent disks 157; and disk clamp 143 for securing disks 157 and spacer ring 155 to motor-hub assembly 140. Disk 157 has at least one surface 130 upon which reside data tracks 135. Disk 157 is coupled to motor-hub assembly 140 whereby disk 157 can rotate about an axis common to motor-hub assembly 140 and the center of disk 157.

With continued reference to FIG. 3 and in accordance with an embodiment of the present invention, HDD 300 comprises hybrid planar plate 200. Hybrid planar plate 200 is an airflow control device configured to mitigate flow-induced vibration (FIV) within HDD 300.

In accordance with an embodiment of the present invention and with continued reference to FIG. 1, FIG. 2A, FIG. 2B, and FIG. 3, hybrid planar plate 200 comprises outer perimeter 220 having a radius which is equal to or greater than the outer radius of disk 157 in HDD (100, 300). Thickness 230 of hybrid planar plate 200 is less than the spacing between adjacent disks 157 in HDD (100, 300). The spacing between adjacent disks 157 in HDD (100, 300) is defined by the thickness of spacer ring 155. Hybrid planar plate 200 comprises central opening 240 which has an inner perimeter surface 245 that is greater than the outer circumference of spacer ring 155. Notch 250 in outer perimeter 220 of hybrid planar plate 200 accommodates actuator assembly 120 of HDD (100, 300). Notch 250 provides access to disk 157 by actuator assembly 120 and HDD slider 125 for arcuate accessing of data tracks 135. Hybrid planar plate 200 comprises bypass slot 210.

In accordance with an embodiment of the present invention, hybrid planar plate 200 comprises bypass slot 210 which transects outer perimeter 220. Hybrid planar plate 200 further comprises bend 227 with radius 229 whose center 222 is nearly coincident with center 242 of central opening 240. In general, bypass slot 210 comprises surfaces (212, 214). Surfaces (212, 214) are separate along their lengths by a distance that can vary along the lengths of surfaces (212, 214). In accordance with another embodiment of the present invention, bypass slot 210 of hybrid planar plate 200 is open and coupled to central opening 240, whereby the side of bypass slot 210 which has bend 227 is discontinuous.

Notch 250 in outer perimeter 220 of hybrid planar plate 200 provides access for actuator assembly 120. In accordance with an embodiment of the present invention notch 250 comprises at least one curved surface 252, whereby the surface area of hybrid planar plate 200 is maximized while accommodating the arcuate motion of actuator assembly 120. In accordance with another embodiment of the present invention, notch 250 comprises at least one approximately flat surface 254, whereby clearance is provided to accommodate the accessing limit of actuator assembly 120. In accordance with another embodiment of the present invention, notch 250 is open and coupled to central opening 240 by gap 256 comprised within inner perimeter surface 245. In accordance with another embodiment of the present invention, gap 256 is configured so as to allow passage of spacer ring 155 to facilitate the assembly of HDD (100, 300).

In accordance with an embodiment of the present invention, hybrid planar plate 200 has attachment feature 260 for mechanically coupling outer perimeter 220 to HDD (100, 300). There exist many attachment techniques well known to one of ordinary skill in the art for coupling hybrid planar plate 200 to HDD 100. For example, hybrid planar plate 200 is coupled to HDD (100, 300) by fastening with screws, by adhesive bonding, and by welding to base casting (113, 313). Welding hybrid planar plate 200 to base casting (113, 313) is typically performed prior to assembly of fragile sub assemblies such as actuator assembly 120 and disk stack 158. Coupling hybrid planar plate 200 to base casting (113, 313) with screws and adhesive can be performed prior to or after assembly of fragile sub assemblies such as actuator assembly 120 and disk stack 158.

With continued reference to FIG. 3 and in accordance with another embodiment of the present invention, hybrid planar plate 333 is integral to base casting 313. Hybrid planar plate 333 is fabricated simultaneously with base casting 313 during the casting and machining processes for fabricating base casting 313. The casting and machining processes for fabricating base casting 313 are well known and understood by one of ordinary skill in the art and for the sake of brevity and clarity will not be described in detail. FIG. 3 presents one embodiment of the present invention wherein base casting 313 is fabricated in two sections which are separable at parting line 316. In accordance with an embodiment of the present invention, outer perimeter 220 of hybrid planar plate 333 is integral to base casting 313 and couples hybrid planar plate 333 to base casting 313.

Figure 4:
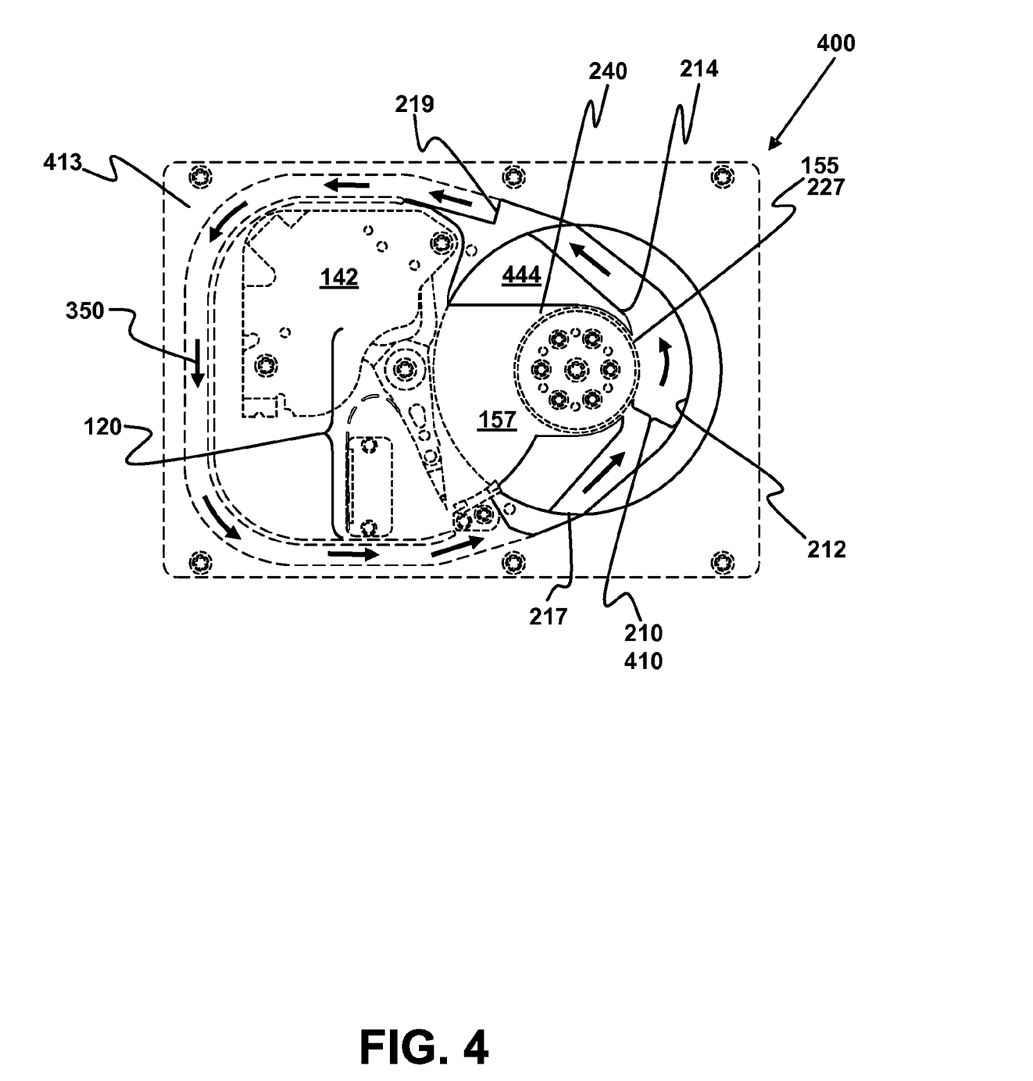
FIG. 4 is a plan view of a hard disk drive with cover removed in accordance with an embodiment of the present invention.

With reference to FIG. 4, a plan view of HDD 400 with cover 112 removed is presented in accordance with an embodiment of the present invention. Hybrid planar plate 444 is fabricated simultaneously with base casting 413 during the casting and machining processes for fabricating base casting 413. The casting and machining processes for fabricating base casting 413 are well known and understood by one of ordinary skill in the art and for the sake of brevity and clarity will not be described in detail. FIG. 4 presents one embodiment of the present invention wherein hybrid planar plate 444 is fabricated integrally with base casting 413. Well known and understood by one of ordinary skill in the art of casting are techniques for casting internal features in base casting 413 such as hybrid planar plate 444. Prior to the coupling of actuator assembly 120 to base casting 413, disk stack 158 is inserted into base casting 413 and hybrid planar plate 444 is interleaved between adjacent disk surfaces 130.

In accordance with an embodiment of the present invention, hybrid planar plate 200 is a component separately fabricated from base casting 113 and upon interleaving between adjacent disk surfaces 130 is coupled to base casting 113. In accordance with another embodiment of the present invention, hybrid planar plate (200, 333, 444) is coupled with base casting (113, 313, 413) and upon coupling disk stack 158 with base casting 413, hybrid planar plate (200, 333, 444) is interleaved between adjacent disk surfaces 130.

With continued reference to FIG. 4 and in accordance with an embodiment of the present invention, bend 227 in bypass slot 210 comprises spacer ring 155. In general, bypass slot 210 comprises surfaces (212, 214). Surfaces (212, 214) are separate along their lengths by a distance that can vary along the lengths of surfaces (212, 214). In accordance with an embodiment of the present invention, bypass slot 210 of hybrid planar plate 200 is open and coupled to central opening 240, whereby the surface 214 of bypass slot 210 which has bend 227 is discontinuous and comprises spacer ring 155.

With continued reference to FIG. 3 and FIG. 4 and in accordance with an embodiment of the present invention, bypass slot 210 comprises first distal opening 217 wherein airflow 350 from disk 157 upon rotation enters bypass slot 210. Bypass slot 210 comprises second distal opening 219 wherein airflow 350 from disk 157 upon rotation exits bypass slot 210.

With continued reference to FIG. 4 and in accordance with an embodiment of the present invention, first distal opening 217 wherein airflow 350 from disk 157 upon rotation enters bypass slot 210, is mechanically coupled to base casting 413. It is appreciated that mechanical coupling of first distal opening 217 to base casting 413 is accomplished with one of several methods well known in the art. For examples first distal opening 217 is mechanically coupled to base casting 413 by: adhesive, welding, rivet, swaging, and screw. In accordance with an embodiment of the present invention, second distal opening 219 wherein airflow 350 from disk 157 upon rotation exits bypass slot 210, is mechanically coupled to base casting 413. It is appreciated that mechanical coupling of second distal opening 219 to base casting 413 is accomplished with one of several methods well known in the art. For examples second distal opening 219 is mechanically coupled to base casting 413 by: adhesive, welding, rivet, swaging, and screw. In accordance with another embodiment of the present invention first distal opening 217 and/or second distal opening 219 is integral with base casting (313, 413). First distal opening 217 and/or second distal opening 219 is (are) cast with base casting (313, 413) simultaneously with the fabrication process of base casting (313, 413).

Operation

Figure 5:
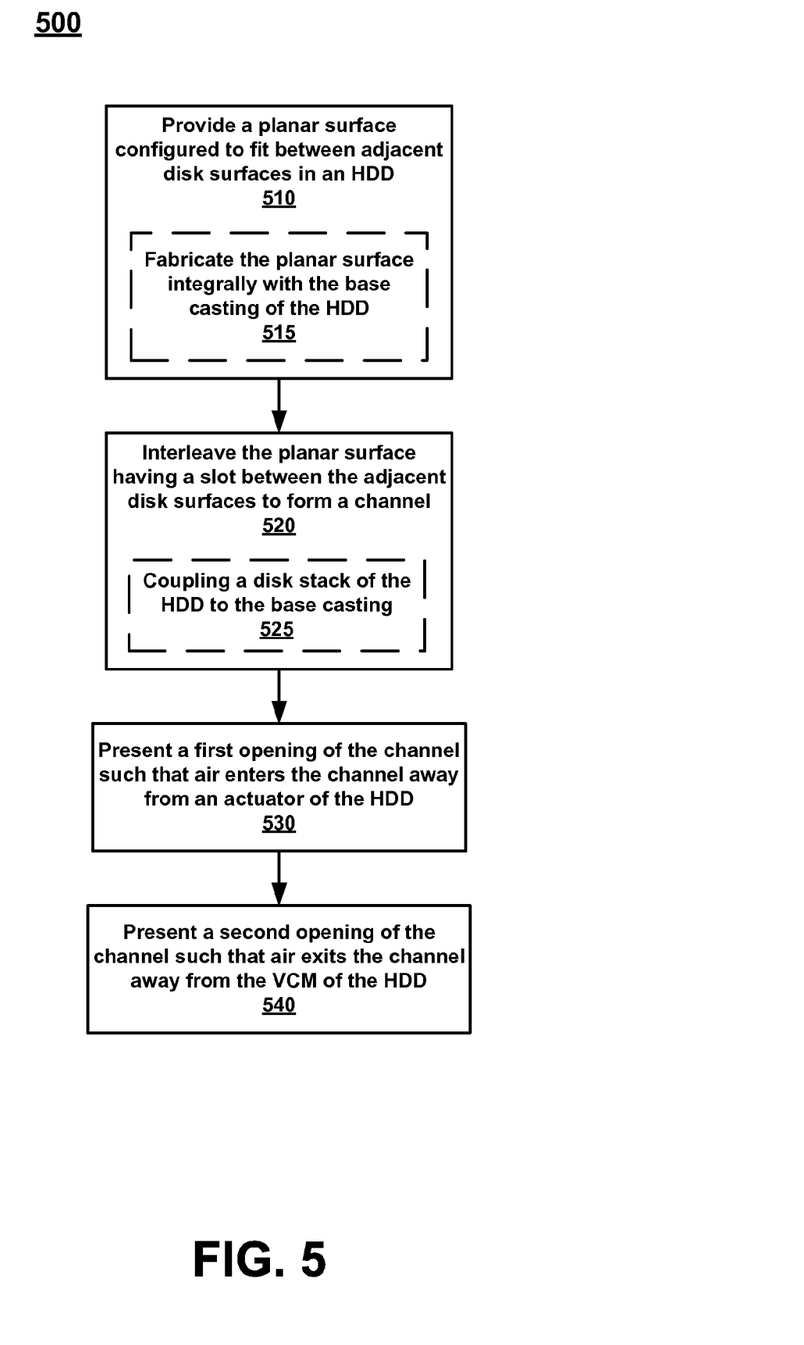
FIG. 5 is a flow chart illustrating a process for minimizing flow induced vibration in a hard disk drive in accordance with an embodiment of the present invention.

FIG. 5 is a flow chart illustrating process 500 for reducing airflow induced vibration in a hard disk drive by enabling laminar flow of airflow, which results from rotation of a disk, in accordance with an embodiment of the present invention. In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are exemplary. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

Process 500 will be described with reference to elements shown in FIG. 1, FIG. 2A, FIG. 2B, FIG. 3, and FIG. 4.

In one embodiment, as shown at 510 of process 500, a planar surface such as hybrid planar plate (200, 333, 444), which is configured to fit between adjacent disk surfaces 130 in an HDD such as HDD (100, 300, 400) is provided. In one embodiment, hybrid planar plate 200 is a separate component, which can be coupled with HDD (100, 300).

In another embodiment, as shown at 515 of process 500, hybrid planar plate (333, 444) is partially or totally fabricated integral with base casting (313, 413). Hybrid planar plate (333, 444) is fabricated simultaneously in part or in total with base casting (313, 413) during the casting and machining processes for fabricating base casting (313, 413). The casting and machining processes for fabricating base casting (313, 413) are well known and understood by one of ordinary skill in the art and for the sake of brevity and clarity will not be described in detail.

In one embodiment, as shown at 520 of process 500, a planar surface such as hybrid planar plate (200, 333, 444), is interleaved between adjacent disk surfaces 130 of disks 157 in HDD (100, 300, 400). In so interleaving, bypass channel (310, 410) is formed. In general, bypass channel (310, 410) comprises surfaces (212, 214) and disk surface 130. Surfaces (212, 214) are separate along their lengths by a distance that can vary along the lengths of surfaces (212, 214). In accordance with an embodiment of the present invention, bypass channel 410 comprises spacer ring 155. In accordance with an embodiment of the present invention, bypass channel 410 is open and coupled to central opening 240, whereby the surface 214 of bypass slot 210, which has bend 227 is discontinuous and comprises spacer ring 155.

In another embodiment, as shown at 525 of process 500, a planar surface such as hybrid planar plate (200, 333, 444), is interleaved between adjacent disk surfaces 130 of disks 157 in HDD (100, 300, 400) upon coupling disk stack 158 of HDD (300, 400) to base casting (313, 413). In so coupling, bypass channel (310, 410) is formed. In general, bypass channel (310, 410) comprises surfaces (212, 214) and disk surface 130. Surfaces (212, 214) are separate along their lengths by a distance that can vary along the lengths of surfaces (212, 214).

In one embodiment, as shown at 530 of process 500, first distal opening 217 of bypass channel (310, 410) is presented at a location near an outer wall of HDD (300, 400) and away from actuator assembly 120. In so presenting first distal opening 217, airflow 350 enters bypass channel (310, 410) without impinging upon actuator assembly 120 of HDD (300, 400).

In one embodiment, as shown at 540 of process 500, second distal opening 219 of bypass channel (310, 410) is presented at a location near an outer wall of HDD (300, 400) and away from VCM 142. In so presenting second distal opening 219, airflow 350 exits bypass channel (310, 410) away from VCM 142 without impinging upon VCM 142 of HDD (300, 400).

The present invention, in the various presented embodiments enables laminar flow of air within an HDD, reduces airflow induced vibration, while minimizing the increase in motor-hub assembly power and heat typically experienced with planar plate airflow control devices. The present invention, in the various presented embodiments directs airflow through a bypass channel whereby air is prevented from spilling over the edges of disks in a disk stack. Typically, air that spills over the disk edges interacts with other disks and induces vibration in the disk stack. The present invention, in the various presented embodiments directs airflow through a bypass channel whereby air is prevented from impinging upon a VCM and/or an actuator assembly, thereby preventing airflow induced vibration of the actuator assembly.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An airflow control device for a hard disk drive comprising:
    an outer perimeter having a radius equal to or greater than an outer radius of a disk in said hard disk drive;
    a thickness less than a spacing between adjacent disks in said hard disk drive;
    a central opening having an inner perimeter surface with a radius greater than an outer radius of a spacer ring of said hard disk drive;
    a notch in said outer perimeter, wherein said notch is configured to accommodate an actuator assembly of said hard disk drive; and
    a bypass slot defined by a length transecting said outer perimeter, wherein said bypass slot has a bend with a radius nearly centered to said central opening and wherein said bypass slot comprises two surfaces along said length of said bypass slot, said length more than half of said outer perimeter, one of said two surfaces is discontinuous and said two surfaces are separated by a distance that varies, said bypass slot forming a first opening for receiving said airflow and a second opening for exiting said airflow, wherein at least said first opening or said second opening is integral with a base casting of said hard disk drive.

2. The airflow control device of claim 1 further comprising attachment features for mechanically coupling said outer perimeter to said hard disk drive.

3. The airflow control device of claim 1 wherein said notch comprises at least one curved surface.

4. The airflow control device of claim 1 wherein said notch comprises at least one approximately flat surface.

5. The airflow control device of claim 1 wherein said notch is open and coupled to said central opening.

6. The airflow control device of claim 1 wherein said bend in said bypass slot is open and coupled to said central opening.

7. A hard disk drive comprising:
    a base casting for providing coupling points for components and subassemblies of said hard disk drive;
    a motor-hub assembly to which at least one disk is coupled allowing rotation of said disk about an axis approximately perpendicular and centered to said disk, wherein said motor-hub assembly is coupled to said base casting, wherein said disk comprises at least one surface of data tracks; and
    an airflow control device comprising:
    an outer perimeter defined by a length having a radius equal to or greater than an outer radius of a disk in said hard disk drive;
    a thickness less than a spacing between adjacent disks in said hard disk drive;

a central opening having an inner perimeter surface with a radius greater than an outer radius of a spacer ring of said hard disk drive;

a notch in said outer perimeter, wherein said notch is configured to accommodate an actuator assembly of said hard disk drive; and a bypass slot transecting said outer perimeter, wherein said bypass slot has a bend with a radius nearly centered to said central opening and wherein said bypass slot comprises two surfaces along said length of said bypass slot, said length more than half of said outer perimeter, one of said two surfaces is discontinuous and said two surfaces are separated by a distance that varies, said bypass slot forming a first opening for receiving said airflow and a second opening for exiting said airflow, wherein at least said first opening or said second opening is integral with said base casting.

8. The hard disk drive of claim 7 wherein said airflow control device is interleaved between adjacent disk surfaces.

9. The hard disk drive of claim 7 further comprising attachment features for mechanically coupling said outer perimeter of said airflow control device to said hard disk drive.

10. The hard disk drive of claim 7 wherein said outer perimeter of said airflow control device is integral to said base casting.

11. The hard disk drive of claim 7 wherein said notch comprises at least one curved surface.

12. The hard disk drive of claim 7 wherein said notch comprises at least one approximately flat surface.

13. The hard disk drive of claim 7 wherein said notch is open and coupled to said central opening.

14. The hard disk drive of claim 7 wherein said bend in said bypass slot comprises said spacer ring.

15. The hard disk drive of claim 7 wherein said bypass slot comprises:

a first distal opening wherein air from said disk upon rotation enters said bypass slot; and a second distal opening wherein air from said disk upon rotation exits said bypass slot.

16. The hard disk drive of claim 15 wherein said first distal opening is mechanically coupled to said base casting.

17. The hard disk drive of claim 15 wherein said second distal opening is mechanically coupled to said base casting.

18. The hard disk drive of claim 15 wherein said first distal opening is integral to said base casting.

19. The hard disk drive of claim 15 wherein said second distal opening is integral to said base casting.

20. A method of reducing airflow induced vibration in a hard disk drive, said method comprising:

providing a planar surface having an outer perimeter and defined by a length and configured to fit between adjacent disk surfaces in a hard disk drive;

interleaving said planar surface between said adjacent disk surfaces, wherein a bypass channel is formed between a bypass slot within said planar surface and said surface of said disk such that said bypass slot comprises two surfaces along said length of said bypass slot, said length more than half of said outer perimeter of said planar surface, one of said two surfaces is discontinuous and said two surfaces are separated by a distance that varies;

presenting a first distal opening of said bypass channel such that upon rotation of said disk, air enters said bypass channel at a location near an outer wall of said hard disk drive, and away from an actuator of said hard disk drive; and presenting a second distal opening of said bypass channel to an outer wall of said hard disk drive such that said air exiting said bypass channel is directed away from a voice coil motor of said hard disk drive, thereby enabling laminar flow of said airflow upon rotation of said disk and reducing airflow induced vibration in said hard disk drive, wherein at least said first distal opening or said second distal opening is integral with a base casting of said hard drive.

21. The method as recited in claim 20, wherein said providing comprises:

fabricating said planar surface integrally with a base casting of said hard disk drive.

22. The method as recited in claim 21, wherein said interleaving comprises:

coupling a disk stack of said hard disk drive to said base casting.

* * * * *

UNITED STATES PATENT AND TRADEMARK OFFICE
CERTIFICATE OF CORRECTION

PATENT NO.         : 8,619,386 B2
APPLICATION NO.    : 12/109829
DATED              : December 31, 2013
INVENTOR(S)        : Andre S. Chan It is certified that error appears in the above-identified patent and that said Letters Patent is hereby corrected as shown below:

Title Page, Item (56)

OTHER PUBLICATIONS, Delete: "Nakamura, S. et al., "Reducing Flow-Induced-Vibration of Head-Gimbal-Assemblies in Hard-Disk-Drives", Asia-Pacific Magnetic Recording Conference, 2006, Publication Date: Nov. 29, 2006-Dec. 1, 2006 http://www.ieexplore.ieee.org/search/srchabstract.jsp?arnumber=4215336&is-number=4215263&punumber=4215262&k2dockey=4215336@ieeenfs&duery=%28%28reduc-ind.sub.−+flo, (Nov. 29, 2006),2 pages."

Insert --Nakamura, S. et al., "Reducing Flow-Induced-Vibration of Head-Gimbal-Assemblies in Hard-Disk-Drives", Asia-Pacific Magnetic Recording Conference, 2006, Publication Date: Nov. 29, 2006-Dec. 1, 2006 http://www.ieexplore.ieee.org/search/srchabstract.jsp?arnumber=4215336&is-number=4215263&punumber=4215262&k2dockey=4215336@ieeenfs&query=%28%28reduc-ind.sub.--+flo, (Nov. 29, 2006),2 pages.--

In the Claims

Column 10, Claim 7, Line 55, Delete: "subassemblies" Insert --sub-assemblies--

Signed and Sealed this
Twenty-eighth Day of April, 2015

Michelle K. Lee
*Director of the United States Patent and Trademark Office*